United States Patent [19]

Calvano

[11] 4,064,049

[45] Dec. 20, 1977

[54] WATER CLEANER

[76] Inventor: Alexander S. Calvano, 24766 Ironwood Ave., Sunnymead, Calif. 92388

[21] Appl. No.: 706,580

[22] Filed: July 19, 1976

[51] Int. Cl.² .............................................. B01D 27/00
[52] U.S. Cl. ..................................... 210/247; 210/438; 210/441; 210/444
[58] Field of Search ............... 210/438, 441, 444, 454, 210/462, 247

[56] References Cited

U.S. PATENT DOCUMENTS

| 120,908 | 11/1871 | Sinclaire | 210/441 X |
| 543,389 | 7/1895 | Loew | 210/437 |
| 1,331,237 | 2/1920 | Burris | 210/444 X |
| 2,365,766 | 12/1944 | Levier | 210/437 X |
| 2,736,435 | 2/1956 | Gardes et al. | 210/438 X |

FOREIGN PATENT DOCUMENTS

| 1,092,787 | 4/1955 | France | 210/247 X |

Primary Examiner—Frank A. Spear, Jr.
Assistant Examiner—Richard W. Burks
Attorney, Agent, or Firm—Harvey S. Hertz

[57] ABSTRACT

A water cleaner is formed of a hollow casing having a water inlet and a water outlet. An elongated tubing is secured to the interior of the casing and contains an inlet and an outlet and means for coupling the tubing inlet to the water inlet and the tubing outlet to the water outlet. A screen surrounds the exterior of the tubing and is secured thereto. A filter element surrounds the screen for removing impurities from the water passing from the casing inlet to the casing outlet.

4 Claims, 5 Drawing Figures

WATER CLEANER

BACKGROUND OF THE INVENTION

1. Field of the Invention

The field of art to which the invention pertains includes the field of water cleaners, particularly with respect to a filter element which is re-usable in a water cleaner.

2. Description of the Prior Art

Conventional water cleaners for filtering impurities from water are normally very complex or expensive. Typically, such structures must be replaceable by a commercial company periodically. Alternatively, where chemicals are used, the chemicals must be either replaced periodically, thus making the cleaning filter an expensive part of the system.

Known prior art includes U.S. Pat. Nos. 295,926; 395,291; 557,075; 1,065,442; 1,213,140; 1,940,923; 2,092,548; 2,365,766; 2,768,751; 2,846,074; and 2,946,450.

The present invention provides a water cleaner for filtering the water supply of a conventional residence or business. The structure is relatively simple to construct and contains a removable filter element which may be re-used after cleaning.

SUMMARY OF THE INVENTION

A water cleaner having a hollow casing containing a water inlet and a water outlet. An elongated tubing is secured to the interior of the casing and contains an inlet and an outlet. The tubing inlet is coupled to the water inlet and the tubing outlet is coupled to the water outlet. A screen surrounds the exterior of the tubing and is secured thereto. A filter element surrounds the screen for removing impurities from water passing from the casing inlet to the casing outlet.

The advantages of this invention, both as to its construction and mode of operation, will be readily appreciated as the same becomes better understood by reference to the following detailed description when considered in connection with the accompanying drawings in which like reference numerals designate like parts throughout the Figures.

DESCRIPTION OF THE PREFERRED EMBODIMENTS

Figure 1:
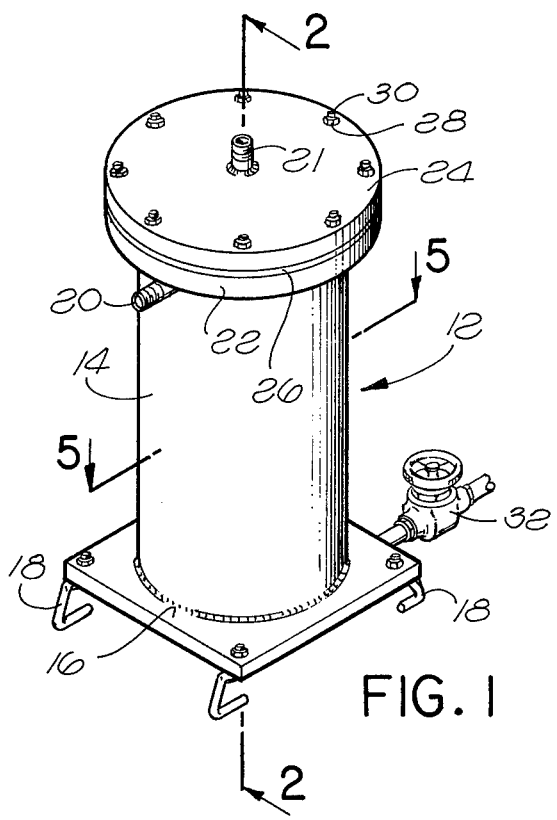
FIG. 1 is a perspective view of the water cleaner constructed in accordance with the principles of the invention.

Referring now to the drawings, there is shown in FIG. 1 a water cleaner 12 constructed in accordance with the principles of the invention. The water cleaner 12 includes a hollow cylindrical casing 14 which is secured at its bottom to a base 16. Typically, the casing is welded or brazed to the base 16. Normally the base contains a plurality of legs 18 enabling the base to be raised above ground level. Water from a conventional source is connected to the casing inlet 20, connected on the side of the casing 14 and filtered water is removed from an outlet 21 positioned on the top of the water cleaner.

Figure 2:
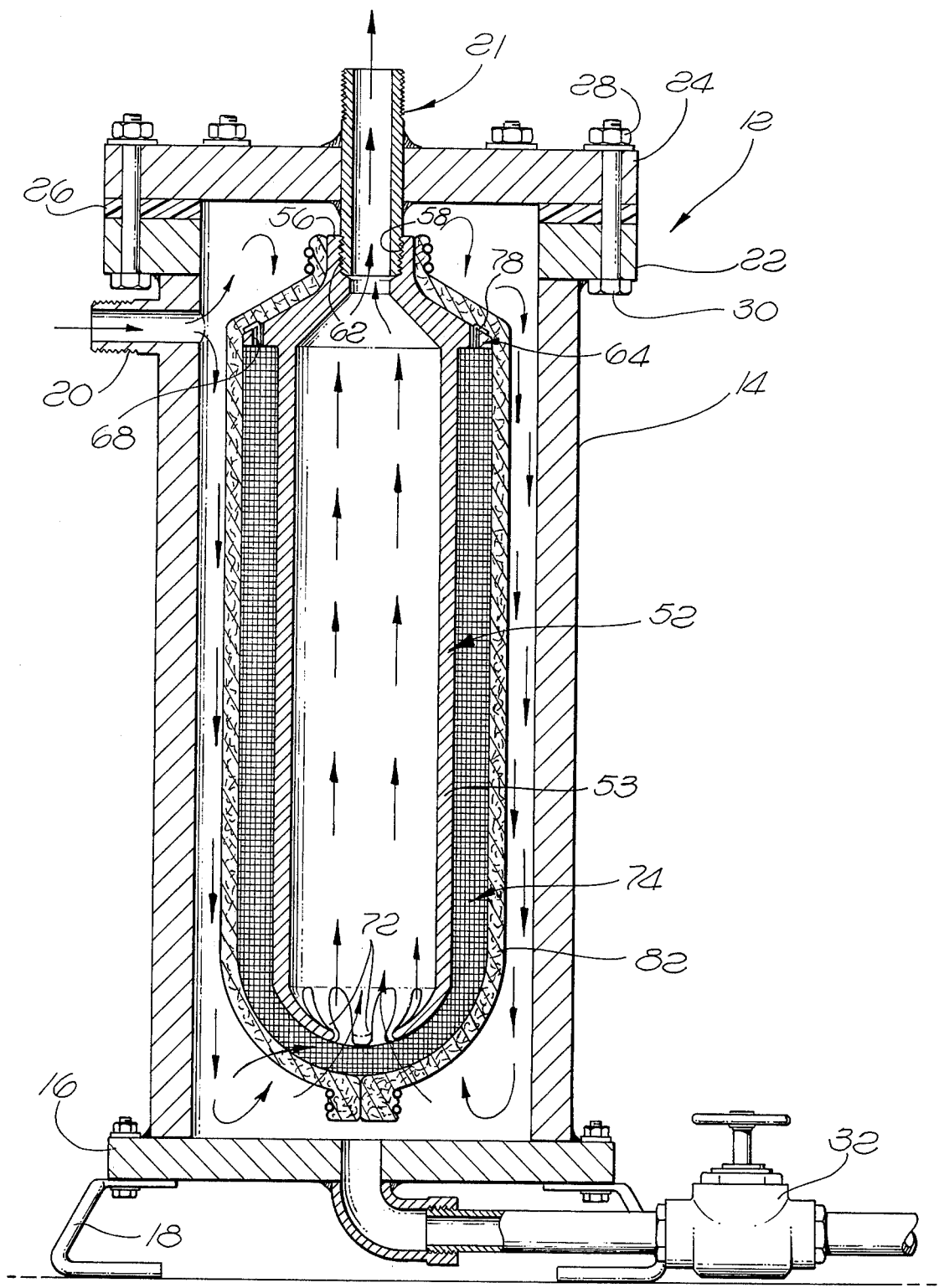
FIG. 2 is a cross-sectional view of the water cleaner of FIG. 1.

Referring now to FIG. 2, the water cleaner is shown in greater detail. The upper end of the casing 14 is welded or otherwise brazed to an outwardly extending flange 22. Mounted above the flange 22 is a top plate 24. A gasket 26 is positioned intermediate the flange 22 and top plate 24. A nut 28 and bolt 30 arrangement is used to secure the flange 22, gasket 26 and top plate 24 together.

The water cleaner outlet 21 extends through the top plate 24 and enables water which has been filtered by the water cleaner 12 to be connected to the water inlet of a house or other facility where filtered water is desired. A drain or flush valve 32 is connected through the base 16 to the interior of the hollow cylindrical casing enabling the water in the casing 14 to be flushed or drained as is conventional.

Mounted within the hollow casing 14 is an elongated tubing 52 formed of solid metal sleeve 53 which is symetrically positioned and coaxial with the axis of the hollow casing 14. The top end 54 of the tubing contains a reduced diameter neck 56 having interior threads 58. The neck 56 is threaded to an exteriorally threaded nipple 62 enabling water in the interior of the tubing 52 to pass through the nipple outlet 21. The outlet 21 is formed of a pipe whose axis extends perpendicular to the top plate 24 and is welded thereto.

Figure 3:
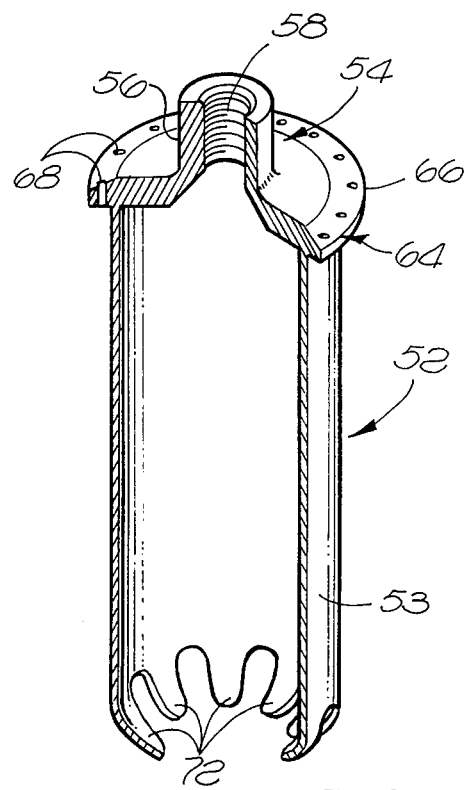
FIG. 3 is a plan view of the tubing used in the water cleaner of FIG. 1.

Referring now to FIG. 3, the tubing 52 is shown in greater detail with the top end 54 thereof formed of a flange 64 whose periphery 66 defines a diameter greater than that of the sleeve 53. A plurality of holes 68 are formed adjacent the tubing flange periphery 66. The bottom of the sleeve 53 adjacent the base 16 is open and is formed of a plurality of inwardly extending fingers 72 formed integral with the sleeve.

Figure 4:
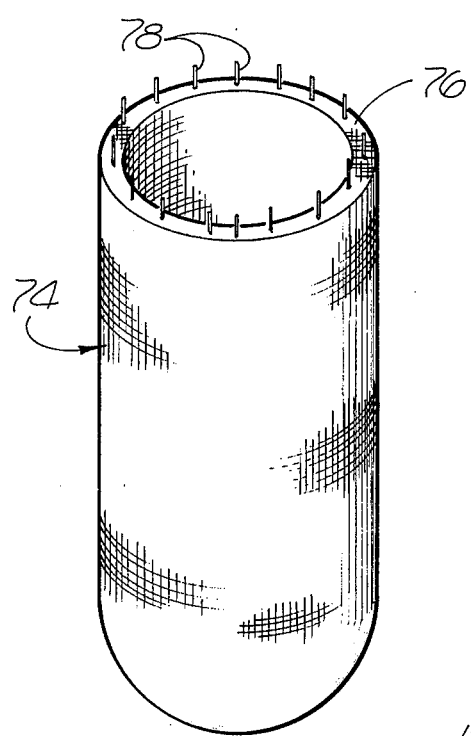
FIG. 4 is a plan view of the screen used in the water cleaner of FIG. 1.
Figure 5:
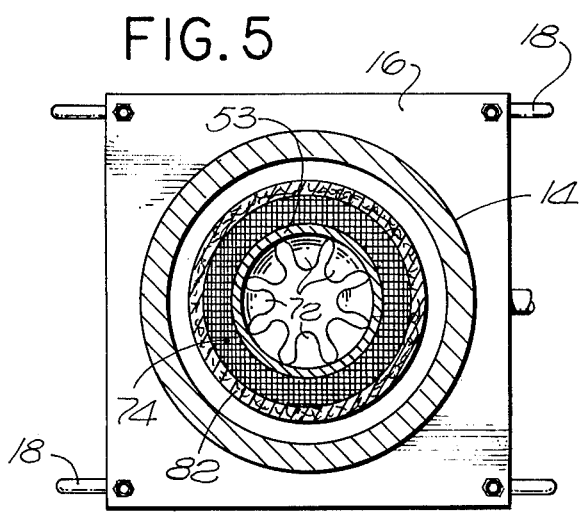
FIG. 5 is a cross-sectional view of the water cleaner of FIG. 1 taken on line 5—5.

A cylindrical screen 74 surrounds the exterior of the tubing 52 and is juxtaposed therewith. The screen 74 is shown in greater detail in FIG. 4 and has a top edge 76 containing fingers 78 which protrude through the flange holes 68 enabling the screen to be secured to the tubing flange 64. The screen 74 forms a tight fit around the exterior surface of the tubing 52 with the top end of the screen abutting the bottom surface of the tubing flange 64 and the outer diameter of the screen being approximately flush with the periphery 66 of the tubing flange 64.

Once the screen has been secured to the tubing 52 the filter element is wrapped around the screen. Typically, the filter element 82 is formed of a cloth. The filter element is a piece of cloth such as linen, felt or cotton or similar fabric which is wrapped a plurality of times around the screen 74. Then strings 84 and 86 are used to secure the filter element at the tubing neck 56 and adjacent the tubing fingers 72 respectively, thus preventing water from entering the interior of the casing 52 except as it passes through the filter element 82 at the bottom of the sleeve 53.

The filter element 82 fabric can be re-used by merely washing the cloth in a conventional washing machine and thereupon replacing the cloth on the screen 74. Water upon entering the casing 14 through the inlet 20 passes through the layers of the filter element 22. The wire screen 74 spaces the filter element from the tubing 52 enabling substantial seepage to occur along the filter element, eventually the water passing through the filter element at the bottom of the sleeve 53 adjacent the fingers 78. After the filtered water has passed through the interior of the casing 52, it can then be removed through the outlet 21.

I claim:

1. A water cleaner comprising: a hollow casing having a water inlet and a water outlet;
   an elongated solid tubing secured to the interior of said casing and having an inlet and an outlet and means for coupling said tubing inlet to said water inlet and said tubing outlet to said water outlet;
   a screen surrounding the exterior of said tubing and being secured thereto; and
   a filter element surrounding said screen for removing impurities from water passing from said casing inlet to said casing outlet, said elongated tubing outlet being formed at one end of said tubing and said tubing inlet consisting of an opening formed at the other end of said elongated tubing for enabling substantial seepage to occur along the filter element prior to allowing filtered water to enter the interior of said tubing and pass to said tubing outlet.

2. A water cleaner in accordance with claim 1 wherein said screen spaces said filter element from said tubing.

3. A water cleaner in accordance with claim 2 wherein said filter element is a cloth member wrapped around said screen.

4. A water cleaner in accordance with claim 2 wherein fingers are formed at one end of said tubing for enabling filtered water to pass to the interior of said tubing.

* * * * *